United States Patent
Arrighetti et al.

(10) Patent No.: US 12,535,526 B2
(45) Date of Patent: Jan. 27, 2026

(54) METHOD FOR ESTIMATING THE OPERATING CONDITIONS OF A SWITCHING APPARATUS

(71) Applicant: ABB S.p.A., Milan (IT)

(72) Inventors: Pierantonio Arrighetti, Bossico (IT); Enrico Ragaini, Bergamo (IT)

(73) Assignee: ABB S.p.A., Milan (IT)

( * ) Notice: Subject to any disclaimer, the term of this patent is extended or adjusted under 35 U.S.C. 154(b) by 967 days.

(21) Appl. No.: 17/714,456

(22) Filed: Apr. 6, 2022

(65) Prior Publication Data

US 2022/0341992 A1    Oct. 27, 2022

(30) Foreign Application Priority Data

Apr. 23, 2021 (EP) .................................. 21170062

(51) Int. Cl.
| | |
|---|---|
| *G01R 31/327* | (2006.01) |
| *G01R 19/165* | (2006.01) |
| *G06F 30/20* | (2020.01) |
| *G06F 113/04* | (2020.01) |
| *H02J 3/38* | (2006.01) |
| *H02J 13/00* | (2006.01) |

(52) U.S. Cl.
CPC ... *G01R 31/3275* (2013.01); *G01R 19/16528* (2013.01); *G06F 30/20* (2020.01); *H02J 3/381* (2013.01); *H02J 13/00036* (2020.01); *G06F 2113/04* (2020.01); *H02J 2203/20* (2020.01)

(58) Field of Classification Search
CPC .......... G01R 31/3275; G01R 19/16528; G06F 30/20; G06F 2113/04; G06F 2111/10; H02J 3/381; H02J 13/00036; H02J 2203/20; H02J 13/00002; H02J 3/00
See application file for complete search history.

(56) References Cited

U.S. PATENT DOCUMENTS

2002/0053066 A1* 5/2002 Richter .................. G06F 30/20
                                                                716/106

FOREIGN PATENT DOCUMENTS

| | | |
|---|---|---|
| CN | 104217634 A | 12/2014 |
| CN | 207541193 U | 6/2018 |
| EP | 2523203 A1 | 11/2012 |

(Continued)

OTHER PUBLICATIONS

Robiscoe, R. T., A. Kadish, and William B. Maier II. "A lumped circuit model for transient arc discharges." Journal of applied physics 64.9 (1988): 4355-4363 (Year: 1988).*

(Continued)

*Primary Examiner* — Saif A Alhija
(74) *Attorney, Agent, or Firm* — McCarter & English, LLP

(57) ABSTRACT

Described herein is a method for determining a presence of anomalous conditions in a switching apparatus installed in an electric line of an electric power distribution grid. The method includes a sequence of steps for adjusting a lumped-parameter model describing, for each electric phase, the behavior of the switching apparatus during the opening maneuvers of the switching apparatus. Simulation values provided by the lumped-parameter model are used for calculating estimation values indicative of the amounts of arc energy released by the breaking components of the switching apparatus during the opening maneuvers of the switching apparatus.

19 Claims, 11 Drawing Sheets

(56) References Cited

FOREIGN PATENT DOCUMENTS

Figure 1:
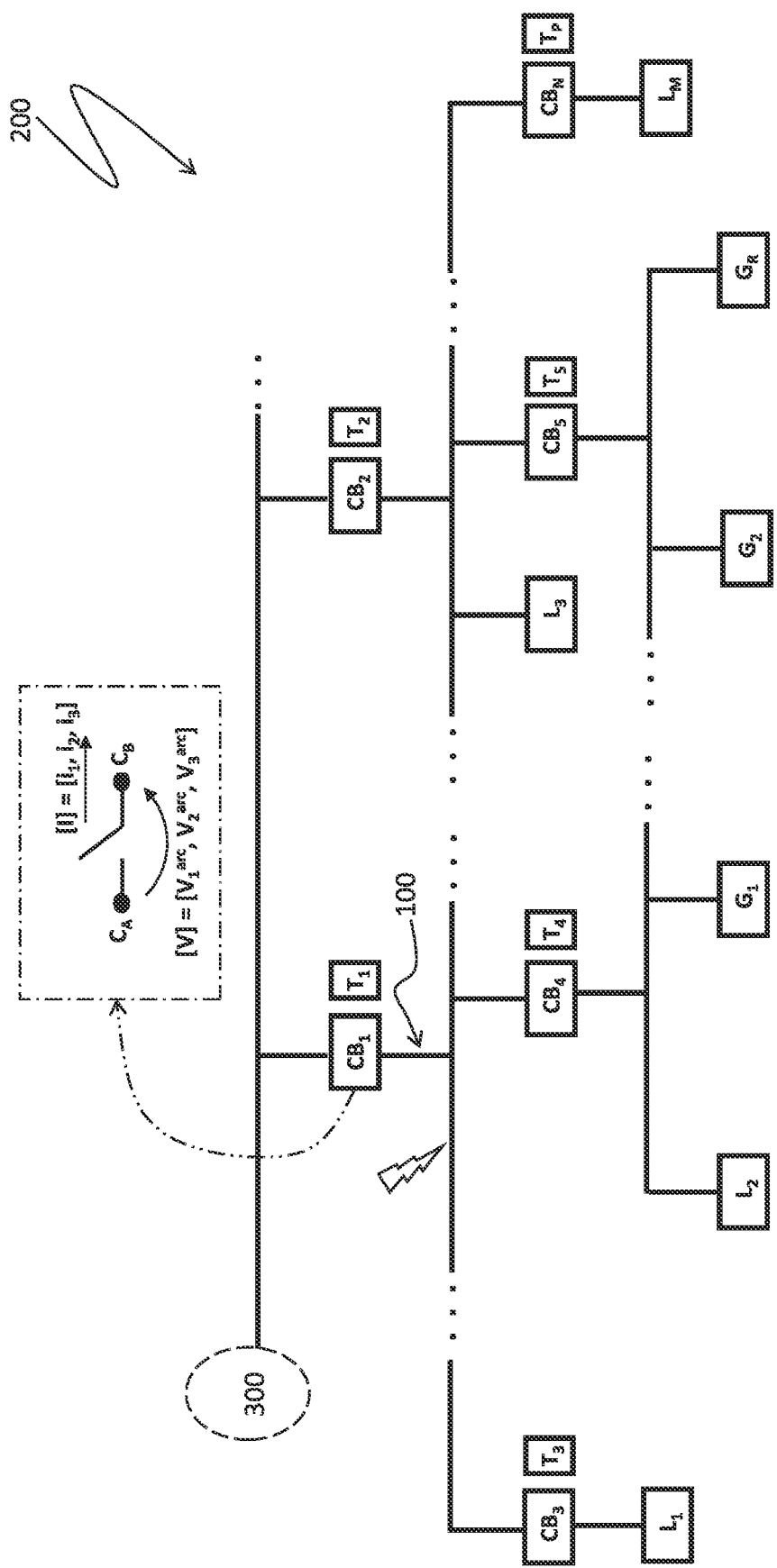

| EP | 2669921 A1 | 12/2013 |
|----|------------|---------|
| EP | 3624159 A1 | 3/2020 |
| FR | 1436174 A | 4/1966 |
| FR | 2013736 A1 | 4/1970 |
| WO | 02093600 A1 | 11/2002 |
| WO | 2017005474 A1 | 1/2017 |

OTHER PUBLICATIONS

Na, Wang, and Liang Yu. "Influence of Model of Circuit-breaker on Very Fast Transient Over-voltage." Physics Procedia 24 (2012): 283-289 (Year: 2012).*

Greenwood et al., "Theory and Application of the Commutation Principle for HVDC Circuit Breakers," IEEE Transactions on Power Apparatus and Systems, IEEE Inc. New York, US, vol. PAS91, No. 4, Jul. 1, 1972, p. 1570-1574, XP002049258, ISSN:0018-9510.

Bachmann et al., "Development of a 500 kv Air Blast HVDC Circuit Breaker," IEEE Transactions on Power Apparatus and Systems, IEEE Inc. New York, US, vol. 9, No. PAS-104, Sep. 1, 1985, p. 2460-2466, XP002076109, ISSN:0018-9510.

Extended European Search Report for European Application No. 21170062.0, dated Aug. 10, 2021, 5 pages.

* cited by examiner

METHOD FOR ESTIMATING THE OPERATING CONDITIONS OF A SWITCHING APPARATUS

CROSS-REFERENCE TO RELATED APPLICATIONS

This application claims priority to European Patent Application No. 21170062.0, filed Apr. 23, 2021, and titled "METHOD FOR ESTIMATING THE OPERATING CONDITIONS OF A SWITCHING APPARATUS", which is hereby incorporated by reference in its entirety.

BACKGROUND

The present disclosure relates to the technical field of electric power distribution grids. In particular, the present disclosure relates to a computer-implemented method for estimating the operating conditions of a switching apparatus of an electric power distribution grid during its operating life.

Electric power distribution grids are commonly equipped with switching apparatuses designed to enable specific grid portions to properly operate by selectively managing the electrical connection of said grid portions with the remaining grid.

As it is known, in operation, a switching apparatus carries out closing and opening maneuvers to allow or prevent a current to flow along an electric line.

At each opening maneuver, a number of breaking components of the switching apparatus are subject to wear or damages due to fact that electric arcs normally raise between the electric contacts under separation and a certain amount of electric energy (arc energy) has necessarily to be dissipated to complete the opening maneuver.

For this reason, a switching apparatus is normally subject to maintenance interventions directed to checking the operating conditions of the breaking components and replacing possible damaged parts.

Maintenance of switching apparatuses of an electric grid is often carried out routinely, for example on the basis of a regular time scheduling or the number of operations carried out.

This approach, however, may lead to unnecessary intervention costs and service outages as some switching apparatuses may be still in condition to perform well, when they are subject to maintenance.

On the other hand, a periodic maintenance of the switching apparatus may equally lead to sudden faults and unexpected service interruptions of the switching apparatus if anomalous operating conditions are not discovered in a timely manner.

In general, it is quite difficult to understand when a switching apparatus really needs a maintenance intervention as the actual level of wear or damages, to which the breaking components of a switching apparatus are subject, depends on a number of factors linked to the specific history of the switching apparatus, such as the number of opening maneuvers carried out, the operating conditions in which each opening maneuver has been carried out, and the like.

In the market, there is a large demand for solutions allowing to plan predictive maintenance on switching apparatuses of electric power distribution grids, so that maintenance interventions are more effective and, at the same time, really needed to prevent sudden and unexpected service outages without bearing unnecessary costs.

BRIEF DESCRIPTION

In order to respond to this need, the present disclosure provides a method for estimating the operating conditions of a switching apparatus, according to the following claim 1 and the related dependent claims.

The method, according to the present disclosure, includes performing, upon the execution of an opening maneuver by said switching apparatus, the following steps:
  acquiring detection values indicative of a current flowing through the switching apparatus during said opening maneuver;
  providing a lumped-parameter model describing, for each electric phase, the behavior of said switching apparatus during said opening maneuver, said lumped-parameter model being configured to calculate first simulation values indicative of the current flowing through said switching apparatus during said opening maneuver and second simulation values indicative of a voltage between the electric contacts of said switching apparatus under separation during said opening maneuver;
  adjusting, for each electric phase, one or more lumped parameters of said lumped-parameter model in such a way that the first simulation values calculated by said lumped-parameter model match said detection values;
  based on the first simulation values and the second simulation values calculated by said lumped-parameter model with adjusted lumped parameters, calculating, for each electric phase, a first estimation value indicative of an amount of arc energy released during said opening maneuver;
  calculating, for each electric phase, a second estimation value indicative of an estimated cumulative arc energy released during an operating life of said switching apparatus, said second estimation value being calculated, for each electric phase, based on the first estimation values calculated for said opening maneuver and for one or more preceding opening maneuvers of said switching apparatus;
  comparing, for each electric phase, said second estimation value with a predefined threshold value;
  determining that anomalous conditions are present in said switching apparatus, if said second estimation value exceeds said predefined threshold value, for at least an electric phase of said switching apparatus.

In some embodiments, said second estimation value is calculated, for each electric phase, as the sum of the first estimation values calculated for each opening maneuver carried out by said switching apparatus.

In some embodiments, the method, according to the present disclosure, includes the step of providing an alarm signal, if it is determined that anomalous conditions present are in said switching apparatus.

In some embodiments, said step of adjusting one or more lumped parameters of said lumped-parameter model includes the steps of:
  acquiring, for each electric phase, test values indicative of a current flowing through said switching apparatus during an opening maneuver of said switching apparatus, when said switching apparatus operates in predetermined operating conditions;
  adjusting, for each electric phase, one or more lumped parameters of said lumped-parameter model in such a way that the first simulation values provided in output by said lumped-parameter model match said test values;

adjusting, for each electric phase, one or more lumped parameters of said lumped-parameter model in such a way that the first simulation values provided in output by said lumped-parameter model match said detection values in terms of initial time and phase sequence;

adjusting, for each electric phase, one or more lumped parameters of said lumped-parameter model in such a way that the first simulation values provided in output by said lumped-parameter model match said detection values in terms of peak current and power factor;

adjusting, for each electric phase, one or more parameters of said lumped-parameter model in such a way that the first simulation values provided in output by said lumped-parameter model match said detection values in terms of opening instants.

In some embodiments, the method, according to the present disclosure, is performed for opening maneuvers carried out by said switching apparatus in any operating conditions.

In some cases, however, the method, according to the present disclosure, may be performed only for opening maneuvers carried out by said switching apparatus in short-circuit conditions or overload conditions or both.

In a further aspect, the present disclosure relates to a computer program, according to the following claim 9.

In a further aspect, the present disclosure relates to a computerized device, according to the following claim 10.

Further characteristics and advantages of the present disclosure shall emerge more clearly from the description of preferred but not exclusive embodiments illustrated purely by way of example and without limitation in the attached drawings.

DRAWINGS

Figure 2:
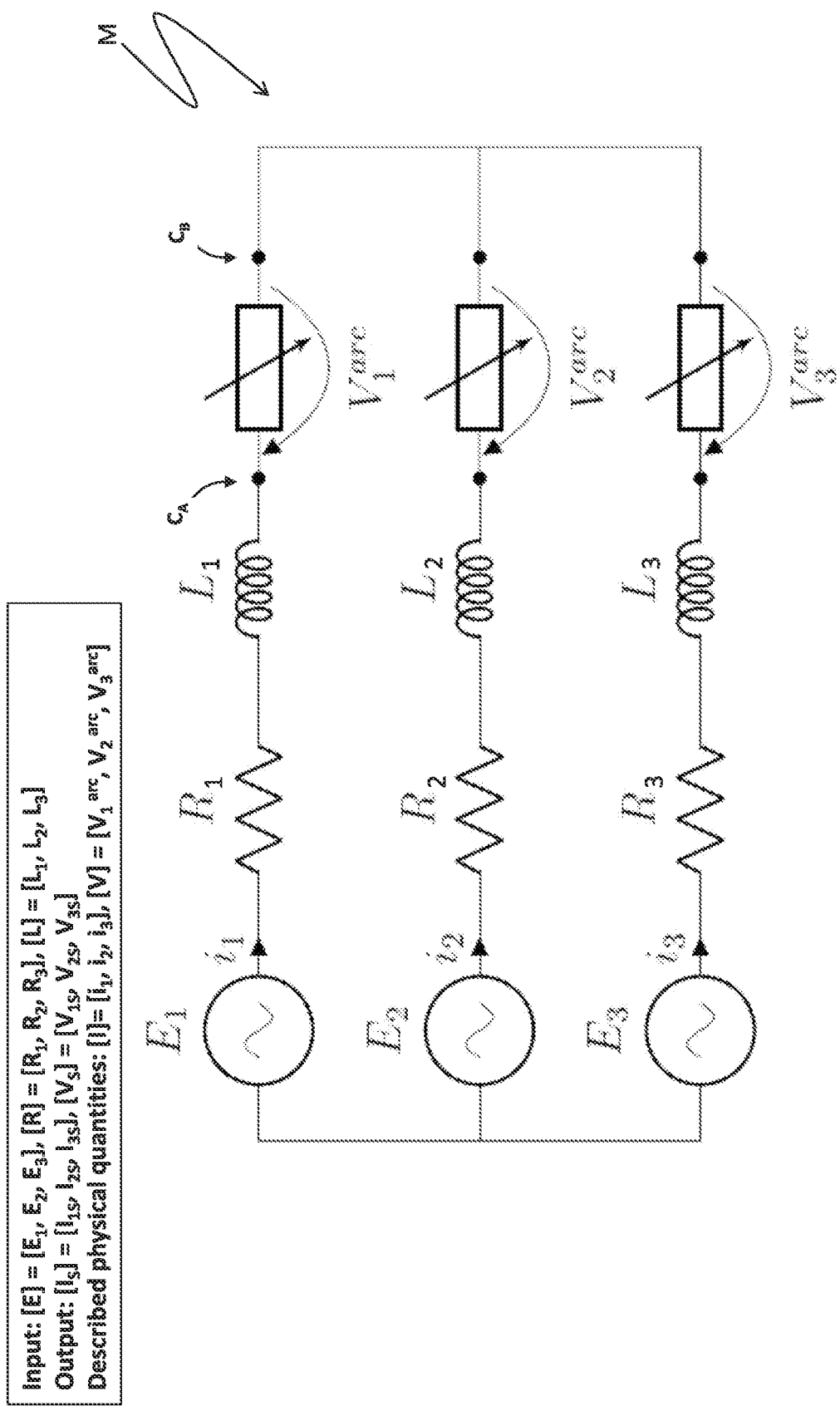

FIG. 1 schematically illustrates a grid sector of an electric power distribution grid;

FIG. 2 schematically shows an example of lumped-parameter model for describing the behavior of an electric line, in which a switching apparatus is installed, during an opening maneuver of said switching apparatus;

FIGS. 3-11 are diagrams schematically illustrating the practical implementation of the steps of the method, according to the present disclosure.

DETAILED DESCRIPTION

With reference to the mentioned figures, the present disclosure relates to a method for estimating the operating conditions of a switching apparatus installed in an electric line 100.

FIG. 1 schematically shows an example of grid sector 200 of an electric power distribution grid, which may be a smart grid, a micro-grid, a switchboard, or, more in general, any portion of an electric power distribution grid. As an example, the grid sector 200 may be an electric power distribution network for industrial, commercial or residential buildings or plants.

In general, the grid sector 200 may operate at low or medium voltage levels.

Within the framework of the present disclosure, the term "low voltage" relates to operational voltages up to 1.2 kV AC and 1.5 kV DC whereas the term "medium voltage" relates to operational voltages higher than 1.2 kV AC and 1.5 kV DC up to several tens of kV, e.g. up to 72 kV AC and 100 kV DC.

The grid sector 200 is electrically connected to an electric power source 300, which may be of any type, for example an electric power utility grid or another section of electric power distribution grid.

The grid sector 200 includes a number of electric lines 100 electrically connecting different grid portions or grid levels. Each electric line 100 has one or more of electric phases, normally three electric phases.

The grid sector 200 includes a number of switching apparatuses $CB_1, \ldots, CB_N$, each adapted to control a current flow along a corresponding electric line 100. The switching apparatuses $CB_1, \ldots, CB_N$ are thus adapted to disconnect or connect different grid portions or grid levels of the grid sector 200.

Each switching apparatus $CB_1, \ldots, CB_N$ includes, for each electric phase, a number of breaking components (e.g. electric contacts, arc-breaking plates, arc runners, polymeric arc quenching parts, and the like), which may be conveniently accommodated in a suitable arc chamber or electric pole.

In particular, each switching apparatus $CB_1, \ldots, CB_N$ includes, for each electric phase, at least a pair of electric contacts $C_A$, $C_B$ that can be coupled or separated to allow or prevent a current to flow through the switching apparatus and the corresponding electric line 100.

Each switching apparatus $CB_1, \ldots, CB_N$ can carry out a closing maneuver to move its electric contacts $C_A$, $C_B$ from an uncoupled state to a coupled state and an opening maneuver to move its electric contacts $C_A$, $C_B$ from a coupled state to an uncoupled state.

In general, the switching apparatuses $CB_1, \ldots, CB_N$ of the grid sector 200 may be of known type and they may include, for example, circuit breakers, disconnectors, contactors, switches, switch-disconnectors, or the like. For this reason, hereinafter, they will not be described in further details for the sake of brevity.

Each switching apparatus $CB_1, \ldots, CB_N$ includes or is operatively coupled to a controller $T_1, \ldots, T_P$ configured to control the operation of the switching apparatus.

In some embodiments, the controllers $T_1, \ldots, T_P$ are configured to detect, for each electric phase, detection values indicative of the current flowing through the switching apparatuses operatively coupled thereto, in particular when said switching apparatuses carry out an opening maneuver. To this aim, they may include or be coupled to current sensor means of known type, such as current transformers, Rogowski coils, Hall sensors or the like.

The controllers $T_1, \ldots, T_P$ of the grid sector 200 may be of known type and they may trip units, electronic relays, IEDs (Intelligent Electronic Devices), or the like. For this reason, hereinafter, they will not be described in further details for the sake of brevity.

In general, the grid sector 200 may include a number of electric loads $L_1, \ldots, L_M$, each of which consumes a corresponding amount of electric power provided by the electric power source 300, and possibly, a number of electric power generators $G_1, \ldots, G_R$, each of which provides a corresponding amount of electric power.

The electric loads $L_1, \ldots, L_M$ and the electric power generators $G_1, \ldots, G_R$ of the grid sector 200 may be of known type and they will not be described in further details for the sake of brevity.

As mentioned above, the method, according to the present disclosure, is directed to estimating the operating conditions of a switching apparatus installed in an electric line.

For the sake of simplicity, the method, according to the present disclosure, is now described referring to a three-phase switching apparatus $CB_1$ installed in an electric line 100 of the grid sector 200, as shown in FIG. 1. For this reason, the described electric quantities will be conveniently indicated in a vectorial form (in practice as sets of values).

It is intended, however, that the method, according to the present disclosure, may be carried out for any switching apparatus of an electric power distribution grid.

The method of the present disclosure is carried out following the execution of an opening maneuver OM by the switching apparatus $CB_1$.

In principle, the method of the present disclosure may refer to each opening maneuver carried out by the switching apparatus $CB_1$, independently of the operating conditions, in which said opening maneuver is executed.

Notwithstanding the above, according to some embodiments, the method of the present disclosure may be performed only for the opening maneuvers carried out in specific operating conditions, namely in short-circuit conditions or overload conditions or both short-circuit and overload conditions.

For the sake of clarity, it is specified that:
a switching apparatus operates in nominal conditions when the current flowing along said switching apparatus has operating values about the nominal value, e.g. up to 1.1 times the nominal value or lower;
a switching apparatus operates in overload conditions when the current flowing said switching apparatus has higher operating values, e.g. from 1.1 times the nominal value up to 10 times the nominal value;
a switching apparatus operates in short-circuit conditions when the current flowing along said switching apparatus has even higher operating values, e.g. from 10 times the nominal value up tens of times the nominal value.

The above-mentioned approach finds its technical ground in the circumstance that the level of wear or damages of the above-mentioned breaking components highly depends on the operating conditions in which the opening maneuver is carried out. As an example, electric stresses on breaking components are definitely much higher when the opening maneuver is carried out in short-circuit conditions.

The method of the present disclosure may therefore refer mainly to the opening maneuvers carried out in short-circuit conditions (and possibly in overload conditions) since these opening maneuvers mostly contribute to damaging the breaking components of the switching apparatus.

The method, according to the present disclosure, includes a step of acquiring, following the above-mentioned opening maneuver OM, detection values $[I_D]=[I_{1D}, I_{2D}, I_{3D}]$ indicative of a current $[I]=[i_1, i_2, i_3]$ flowing through the switching apparatus $CB_1$ during said opening maneuver.

In a practical implementation of the method of the present disclosure, the detection values $[I_D]=[I_{1D}, I_{2D}, I_{3D}]$ are conveniently provided by a controller $T_1$ included in or operatively coupled to the switching apparatus $CB_1$. To this aim, the controller $T_1$ may include or be coupled to suitable current sensor means of known type, as mentioned above.

Figure 3:
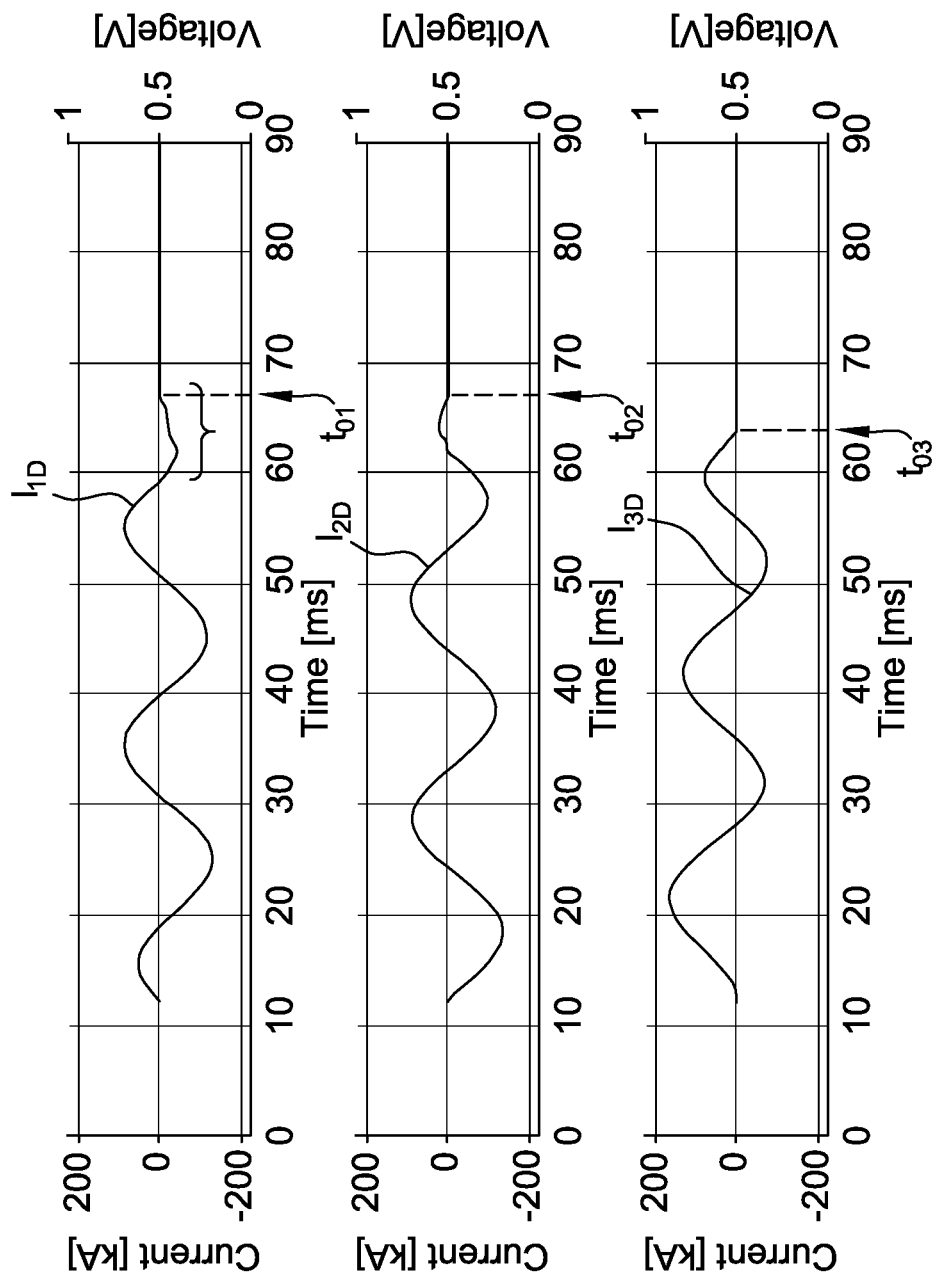

FIG. 3 schematically illustrates an example of characteristic curves describing the trend of the detected current $[I_D]=[I_{1D}, I_{2D}, I_{3D}]$ flowing through the switching apparatus $CB_1$ during the opening maneuver OM. As it is possible to observe, for each electric phase, it is possible to identify an opening instant $t_{O1}, t_{O2}, t_{O3}$, in which the opening maneuver OM is completed.

Contextually to the acquisition of the detection values $[I_D]$, the method, according to the present disclosure, includes a step of providing a lumped-parameter model M describing, for each electric phase, the behavior of the switching apparatus $CB_1$ during the opening maneuver OM.

The lumped-parameter model M is configured to describe, for each electric phase, the behavior of the switching apparatus in terms of ordinary differential equations (with a finite number of parameters) during the opening maneuver OM, in particular to describe the behavior of the current $[I]=[i_1, i_2, i_3]$ flowing through the switching apparatus and of the voltage $[V]=[V_1^{arc}, V_2^{arc}, V_3^{arc}]$ between the electric contacts $C_A, C_B$ under separation of the switching apparatus.

Conveniently, the lumped-parameter model M includes, for each electric phase, a set of adjustable lumped parameters $[E]=[E_1, E_2, E_3]$, $[R_1=R_2, R_3]$, $[L]=[L_1, L_2, L_3]$.

Basing on the input values assigned to said lumped parameters, the lumped-parameter model M provides in output, for each electric phase, first simulation values $[I_S]=[I_{1S}, I_{2S}, I_{3S}]$ indicative of the current $[I]=[i_1, i_2, i_3]$ flowing through switching apparatus and second simulation values $[VS]=[V_{1S}, V_{2S}, V_{3S}]$ indicative of the voltage $[V]=[V_1^{arc}, V_2^{arc}, V_3^{arc}]$ between the electric contacts $C_A, C_B$ of the switching apparatus, during the opening maneuver OM.

FIG. 2 shows an example of lumped-parameter model M. In this case, the first lumped parameters $[E]=[E_1, E_2, E_3]$ relate to the equivalent phase voltage applied to each electric phase of the electric line, and the second lumped parameters $[R]=[R_1, R_2, R_3]$ relate to the equivalent resistance of each electric phase and the third lumped parameters $[L]=[L_1, L_2, L_3]$ relate to the equivalent impedance of each electric phase.

The adoption of the above-mentioned lumped parameter model M finds its technical ground in the following considerations.

In order to calculate the electric energy (arc energy) released during an opening maneuver of the switching apparatus, it is necessary to know, for each electric phase, the behavior of the current $[I]=[i_1, i_2, i_3]$ flowing along the switching apparatus and of the voltage $[V]=[V_1^{arc}, V_2^{arc}, V_3^{arc}]$ between the electric contacts $C_A, C_B$ under separation of the switching apparatus, during said opening maneuver.

The current $[I]=[i_1, i_2, i_3]$ flowing through the switching apparatus $CB_1$ during an opening maneuver can be directly measured through suitable current sensing means, as mentioned above. Instead, a direct measurement, for each electric phase, of the voltage $[V]=[V_1^{arc}, V_2^{arc}, V_3^{arc}]$ between the electric contacts $C_A, C_B$ of the switching apparatus, during an opening maneuver of the switching apparatus, is generally not allowed by international standards for obvious safety reasons, since such a measurement would jeopardize the galvanic separation between the electric contacts.

The above-mentioned lumped parameter model M allows solving this problem as it can describe the behavior of these physical quantities, during an opening maneuver of the switching apparatus, without carrying out any direct voltage measurement.

Obviously, in order to achieve this result, the above-mentioned lumped parameters of the lumped-parameter model M needs to be suitably adjusted at each opening maneuver of the switching apparatus, which is taken into consideration, in such a way to describe correctly the behavior of the electric line 100 during said opening maneuver.

The method, according to the present disclosure, therefore includes a step of adjusting, for each electric phase, one or more lumped parameters of the lumped-parameter model M in such a way that the first simulation values $[I_S]=[I_{1S}, I_{2S}, I_{3S}]$ calculated by the lumped-parameter model M match the detection values $[I_D]=[I_{1D}, I_{2D}, I_{3D}]$.

In practice, in this step of the method of the present disclosure, the detection values $[I_D]=[I_{1D}, I_{2D}, I_{3D}]$ indicative of the actual behavior of the current $[I]=[i_1, i_2, i_3]$ flowing along the switching apparatus, during the opening maneuver OM, are used to calibrate the above-mentioned parameters [E], [R], [L] of the lumped-parameter model M in such a way this latter correctly describes the behavior of the electric line 100 during the opening maneuver OM.

Once the lumped parameters [E], [R], [L] have been suitably adjusted, it is possible to know in full, for each electric phase, the behavior of the current $[I]=[i_1, i_2, i_3]$ flowing along the switching apparatus and, above all, the behavior of the voltage $[V]=[V_1^{arc}, V_2^{arc}, V_3^{arc}]$ between the electric contacts $C_A$, $C_B$ under separation of the switching apparatus, during the opening maneuver OM. This allows estimating the electric energy (arc energy) released during said opening maneuver.

In some embodiments, the step of adjusting the lumped parameters [E], [R], [L] of the lumped-parameter model M includes performing a calibration procedure, which is now described in detail.

In some embodiments, initially, the above-mentioned calibration procedure includes the following steps:
  acquiring, for each electric phase, test values $[I_T]=[I_{1T}, I_{2T}, I_{3T}]$ indicative of a current $[I]=[i_1, i_2, i_3]$ flowing through the switching apparatus $CB_1$, during an opening maneuver in which said switching apparatus operates in predetermined operating conditions;
  adjusting, for each electric phase, one or more parameters [E], [R], [L] of the lumped-parameter model M in such a way that the first simulation values $[I_S]=[I_{1S}, I_{2S}, I_{3S}]$, which are provided in output by the lumped-parameter model M, match the acquired test values $[I_T]=[I_{1T}, I_{2T}, I_{3T}]$.

These steps of the calibration procedure allow initially setting the lumped parameters [E], [R], [L] of the lumped-parameter model M to given known values.

In some embodiments, the above-mentioned test values $[I_T]=[I_{1T}, I_{2T}, I_{3T}]$ are indicative of the maximum short-circuit current that can flow through the switching apparatus.

In this case, the test values $[I_T]$ may be collected by measuring the current flowing along the switching apparatus during an opening maneuver carried out in short-circuit conditions, when a short-circuit fault is caused to occur at a short distance (for example up to few cm), from the switching apparatus.

Figure 4:
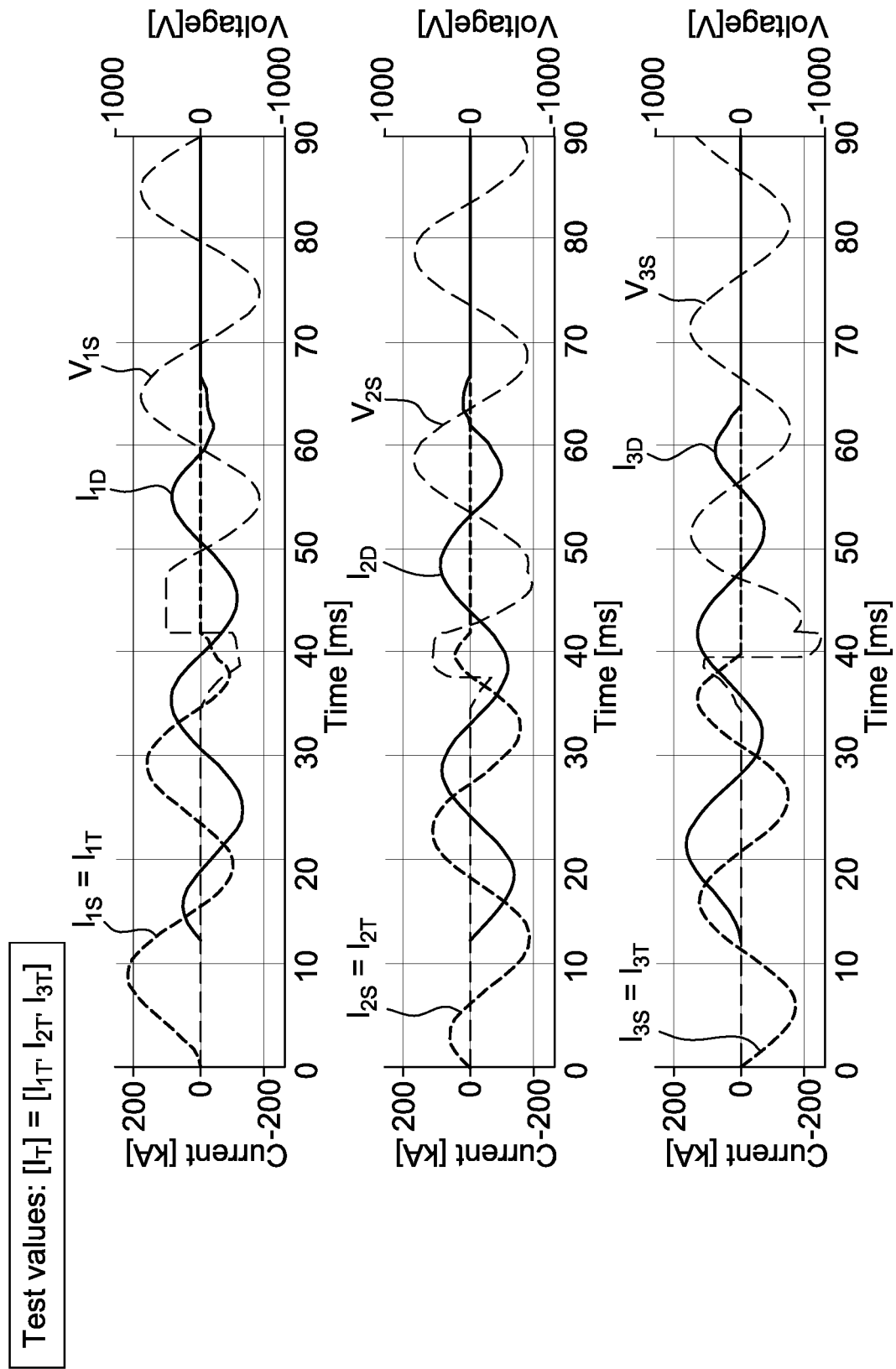

FIG. 4 schematically shows the characteristic curves representing the output quantities provided by the lumped parameter model M at this stage of the calibration procedure.

The lumped parameter model M provides in output first simulation values $[I_S]=[I_{1S}, I_{2S}, I_{3S}]$ coinciding with the test values $[I_T]=[I_{1T}, I_{2T}, I_{3T}]$ and second simulation values $[V_S]=[V_{1S}, V_{2S}, V_{3S}]$ indicative of the voltage between the electric contacts under separation.

As it is possible to appreciate, at this initial stage of the calibration procedure, the first simulation values $[I_S]=[I_{1S}, I_{2S}, I_{3S}]$ may be quite different from the acquired detection values $[I_D]=[I_{1D}, I_{2D}, I_{3D}]$. The above-mentioned simulation values $[I_S]$ and detection values $[I_D]$ are still not homogeneous and they may refer to completely different operating conditions of the switching apparatus.

Therefore, starting from this initial condition, the lumped parameters [E], [R], [L] of the lumped-parameter model M still need to be further adjusted in order to make the first simulation values $[I_S]=[I_{1S}, I_{2S}, I_{3S}]$ suitably approximate the acquired detection values $[I_D]=[I_{1D}, I_{2D}, I_{3D}]$.

In some embodiments, the above-mentioned calibration procedure includes a step of adjusting, for each electric phase, one or more lumped parameters of the lumped-parameter model M (which may be the first lumped parameters [E]) in such a way that the first simulation values $[I_S]=[I_{1S}, I_{2S}, I_{3S}]$, which are provided in output by the lumped-parameter model M, match the detection values $[I_D]=[I_{1D}, I_{2D}, I_{3D}]$ in terms of initial time and phase sequence.

This step of the calibration procedure allows making homogeneous and synchronized in time the first simulation values $[I_S]=[I_{1S}, I_{2S}, I_{3S}]$ and the detection values $[I_D]=[I_{1D}, I_{2D}, I_{3D}]$ in such a way that these values refer to a same observation time interval and to a same electric phase sequence.

Figure 5:
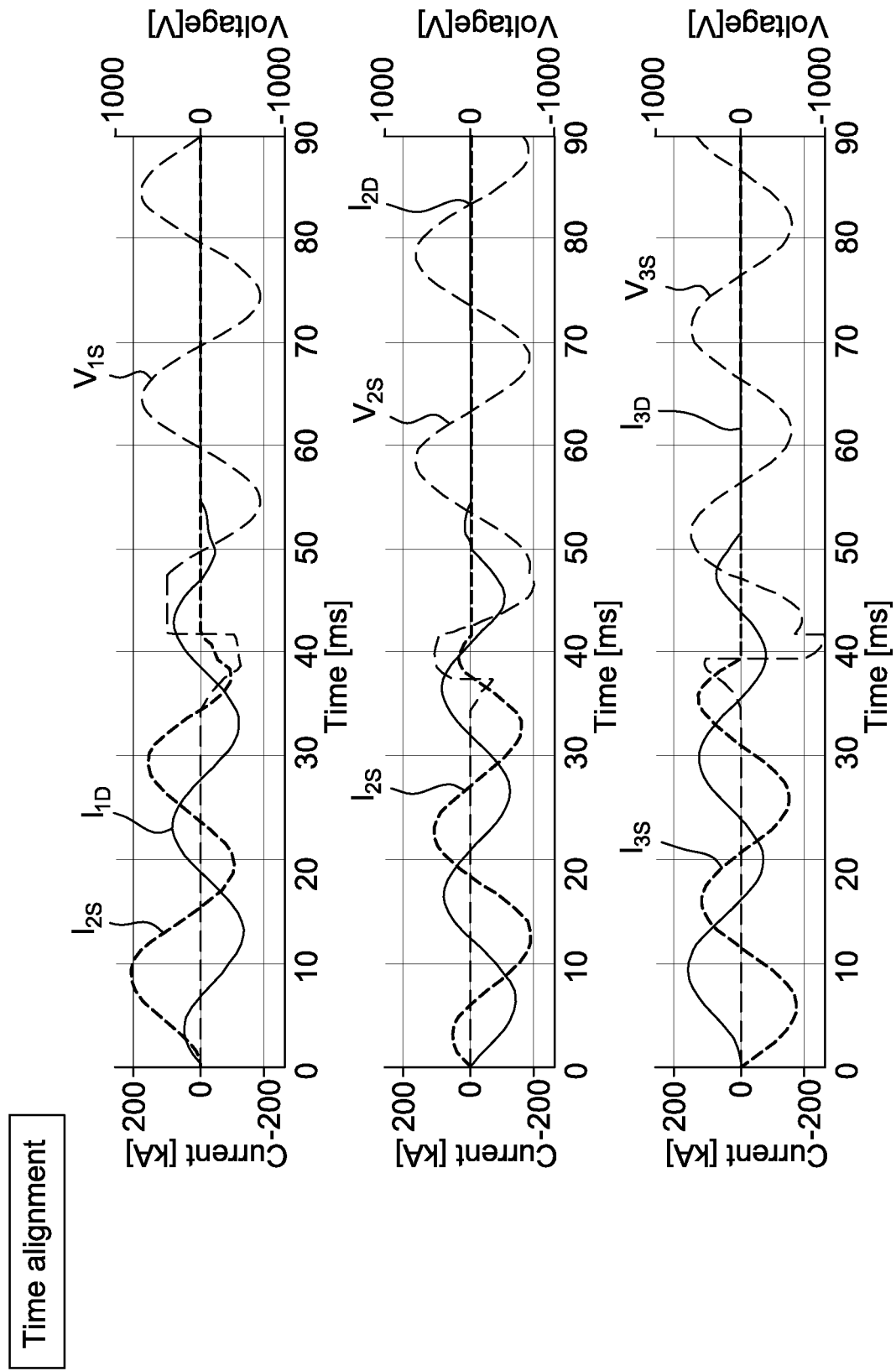
Figure 6:
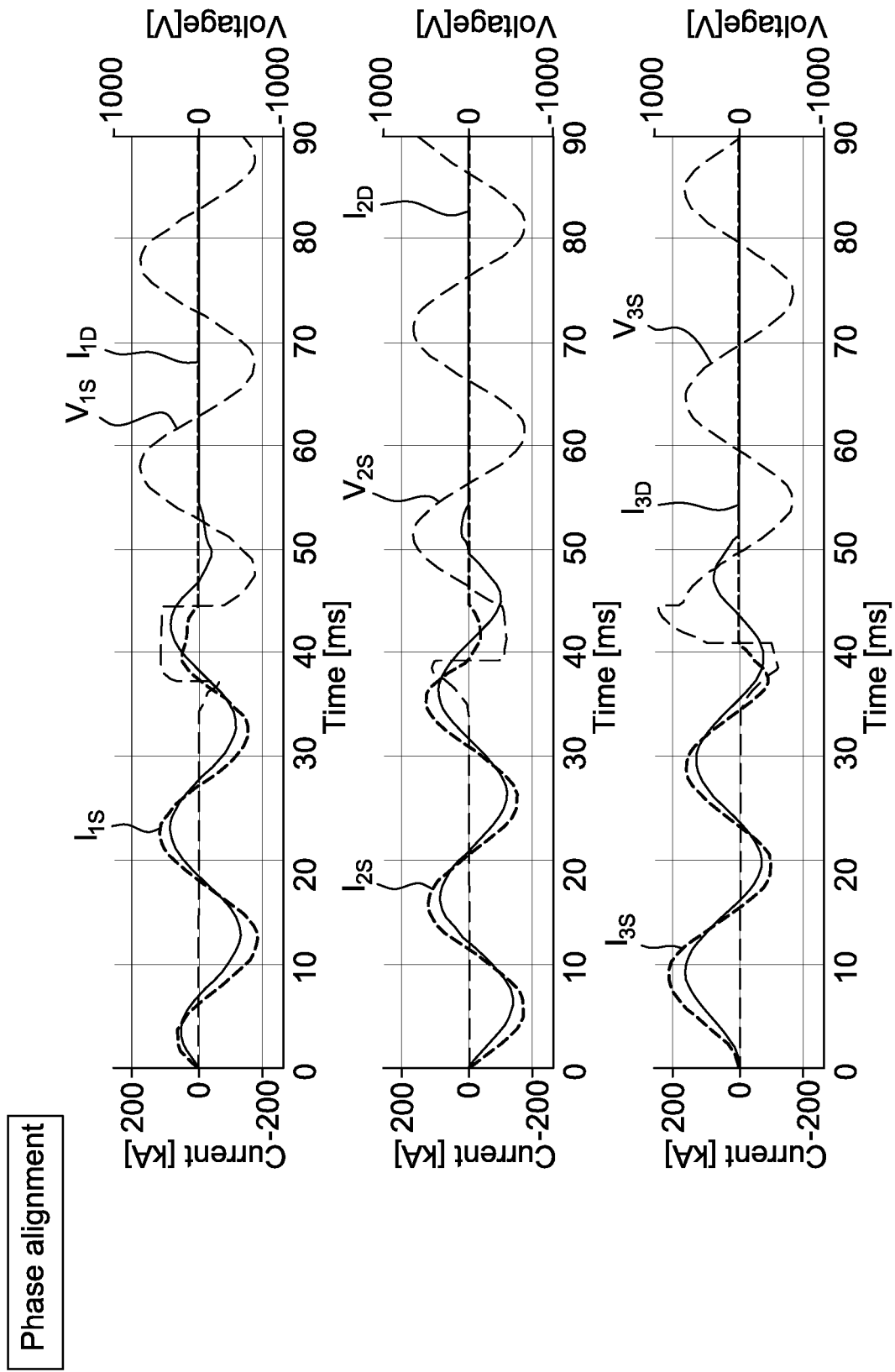

FIGS. 5-6 schematically show the characteristic curves representing the output quantities provided by the lumped parameter model M at this stage of the calibration procedure.

Referring to FIG. 5, it is possible to observe how, at this stage of the calibration procedure, the first simulation values $[I_S]=[I_{1S}, I_{2S}, I_{3S}]$ are aligned in time (they have a same origin instant) with the acquired detection values $[I_D]=[I_{1D}, I_{2D}, I_{3D}]$. In this way, the above-mentioned simulation and detection values refer to a same observation time interval.

Referring to FIG. 6, it is possible to observe how, at this stage of the calibration procedure, the first simulation values $[I_S]=[I_{1S}, I_{2S}, I_{3S}]$ are aligned in terms of phase angle with the acquired detection values $[I_D]=[I_{1D}, I_{2D}, I_{3D}]$. In this way, the above-mentioned simulation and detection values refer to the same electric phases.

In some embodiments, the above-mentioned calibration procedure includes a step of adjusting, for each electric phase, one or more parameters of the lumped-parameter model M (which may be the second and third lumped parameters [R], [L]) in such a way that the first simulation values $[I_S]=[I_{1S}, I_{2S}, I_{3S}]$, which are provided in output by the lumped-parameter model M, match the detection values $[I_D]=[I_{1D}, I_{2D}, I_{3D}]$ in terms of peak current and power factor.

Figure 7:
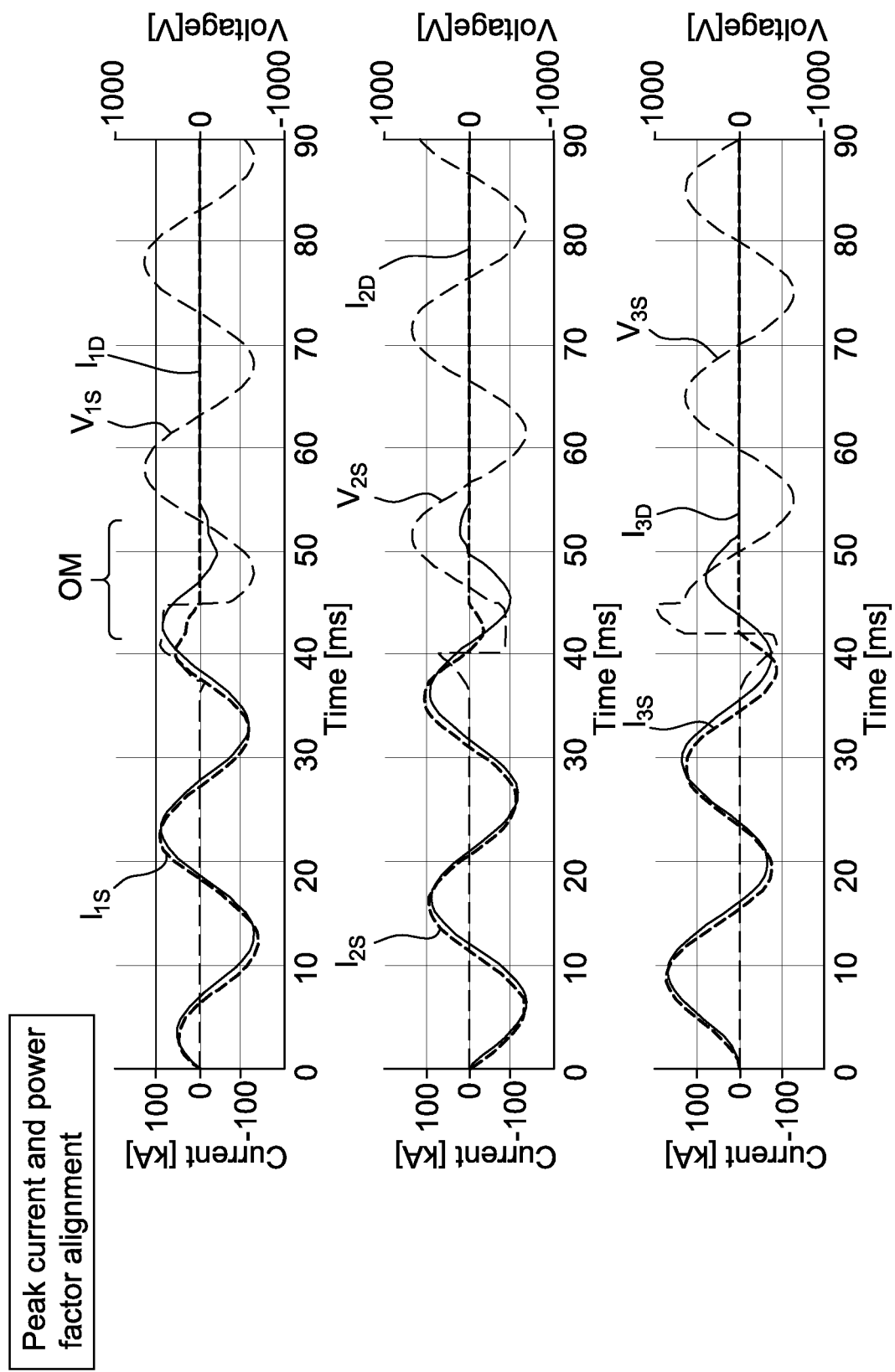

FIG. 7 schematically shows the characteristic curves representing the output quantities provided by the lumped parameter model M at this stage of the calibration procedure.

As it is possible to notice, the first simulation values $[I_S]=[I_{1S}, I_{2S}, I_{3S}]$ now substantially match the detection values $[I_D]=[I_{1D}, I_{2D}, I_{3D}]$ (in terms of current amplitude and current peaks) in the period of time preceding the opening maneuver.

In some embodiments, the above-mentioned calibration procedure includes a step of adjusting, for each electric phase, one or more parameters of the lumped-parameter model M (which may be the first lumped parameters [E]) in such a way that the first simulation values $[I_S]=[I_{1S}, I_{2S}, I_{3S}]$, which are provided in output by the lumped-parameter model M, match the detection values $[I_D]=[I_{1D}, I_{2D}, I_{3D}]$ in terms of opening instants.

Figure 8:
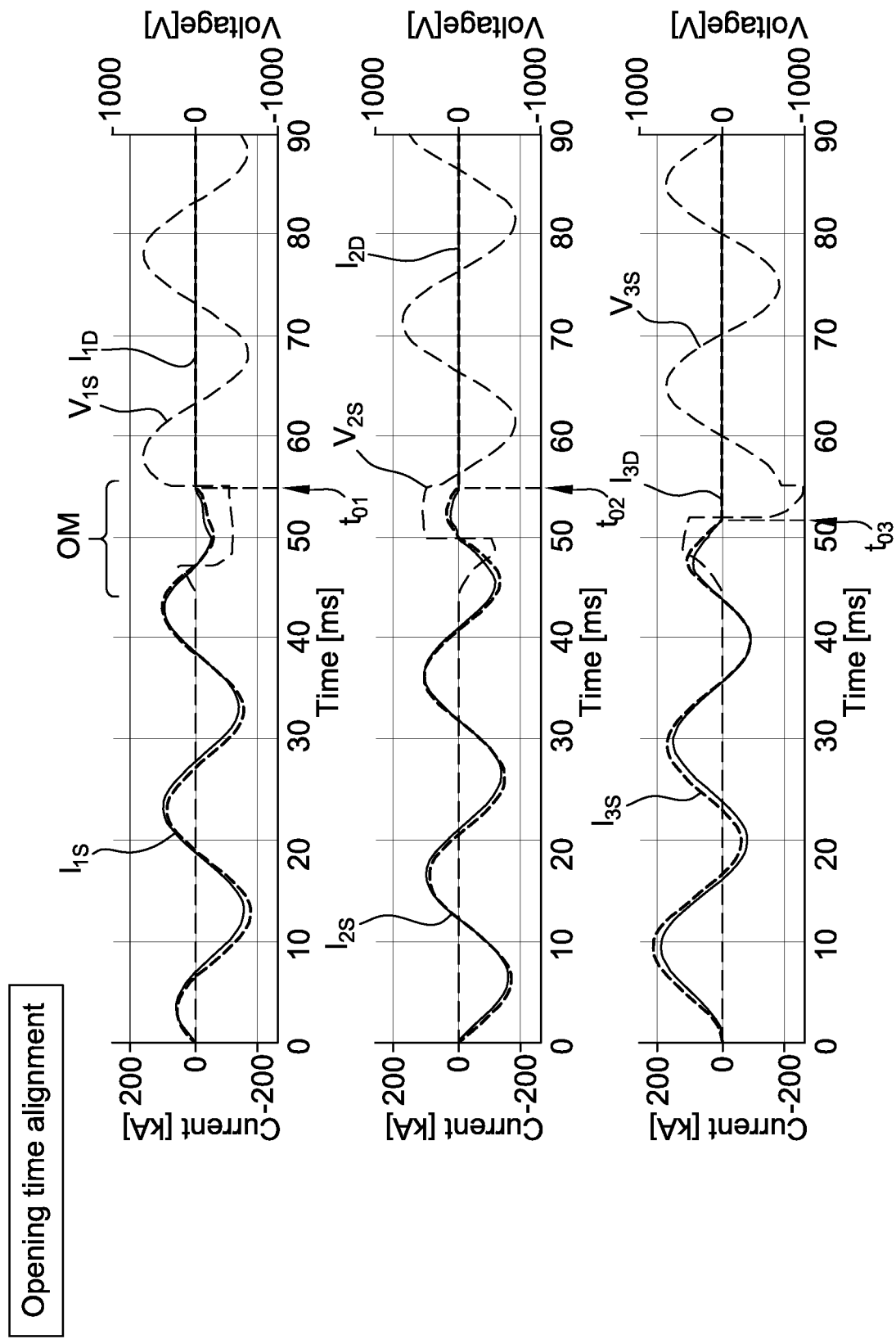
Figure 9:
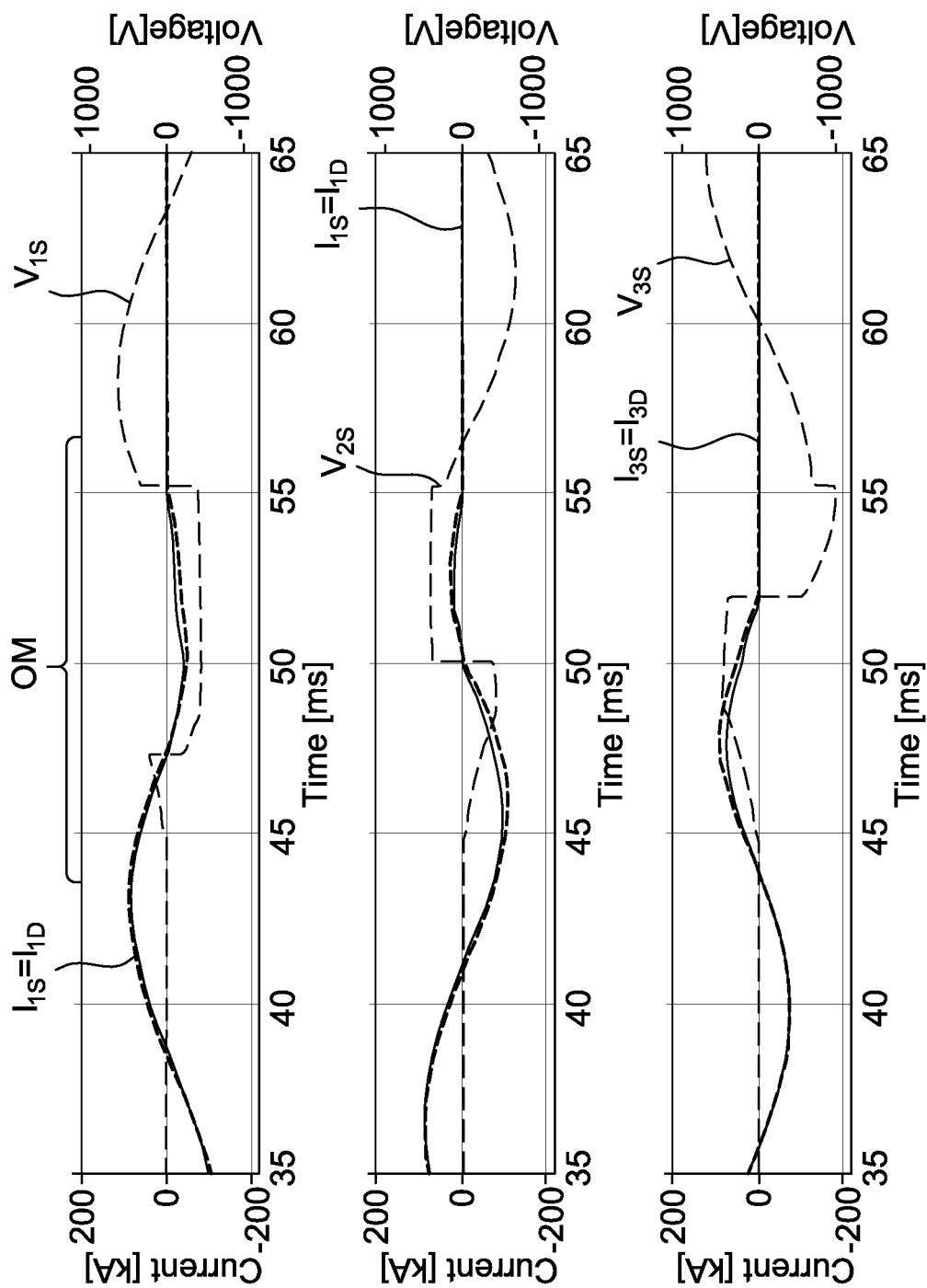
Figure 10:
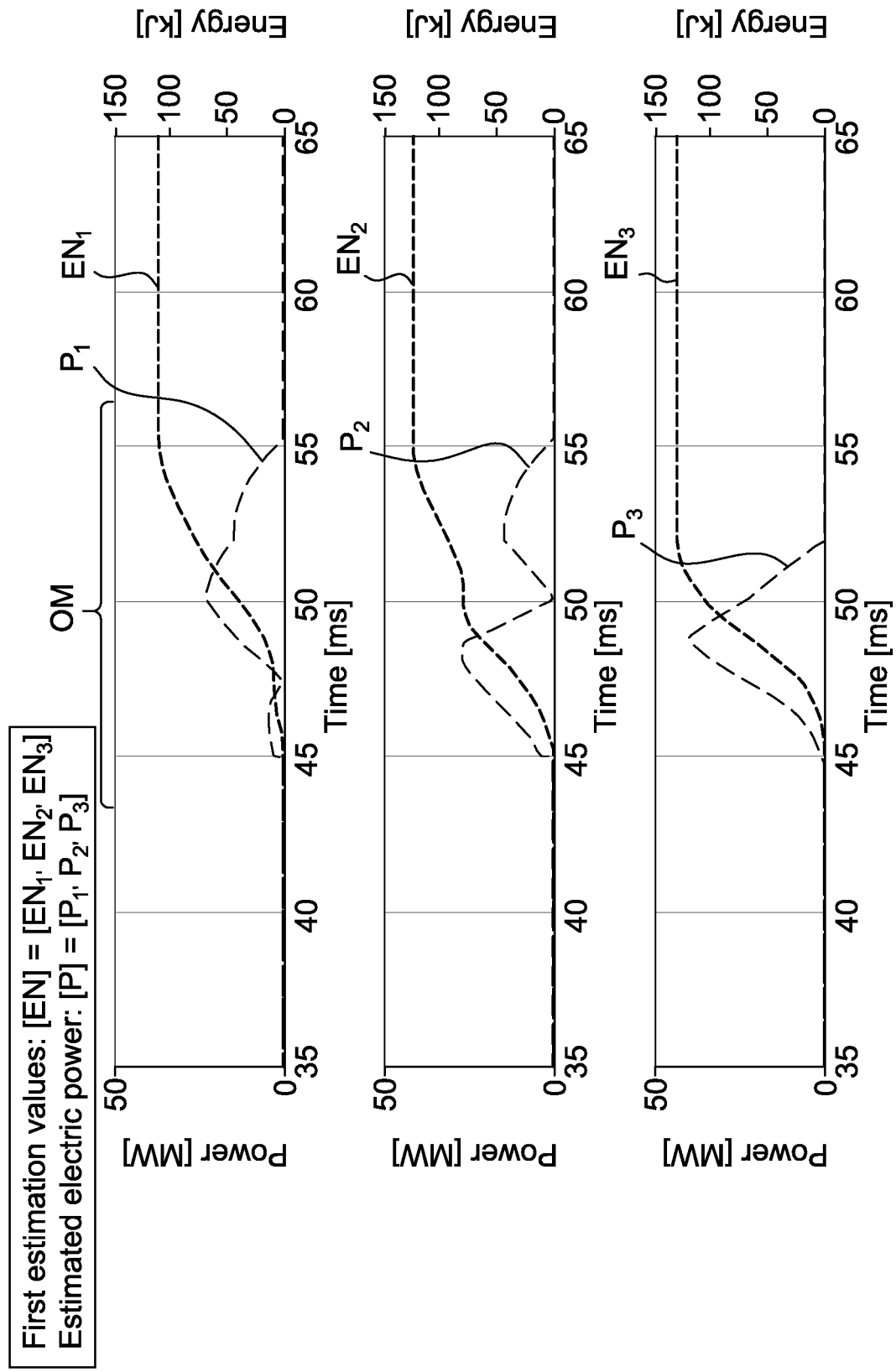
Figure 11:
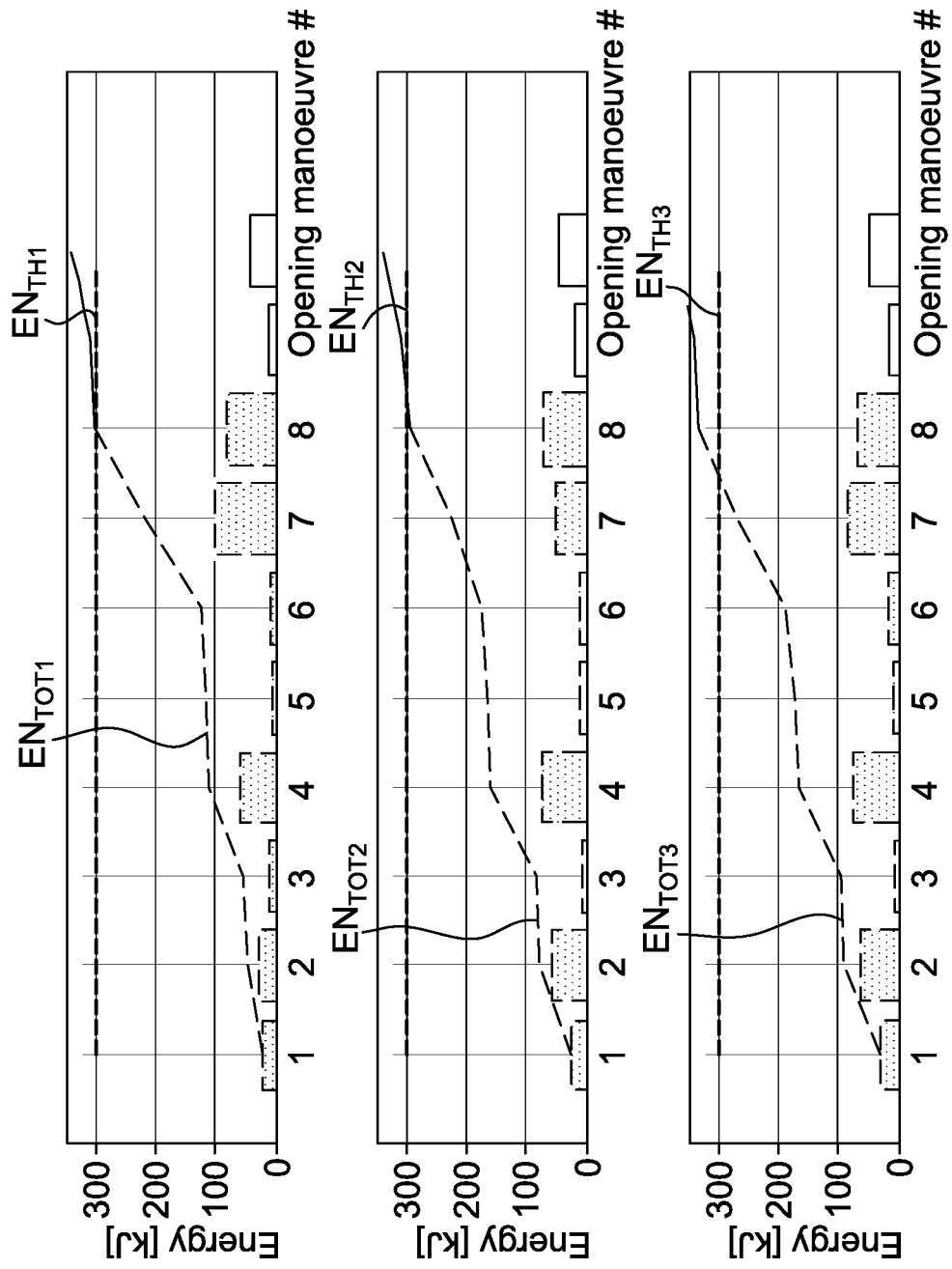

FIGS. 8-9 schematically show the characteristic curves representing the output quantities provided by the lumped parameter model M at this stage of the calibration procedure.

As it is possible to notice, the first simulation values $[I_S]=[I_{1S}, I_{2S}, I_{3S}]$ and the detection values $[I_D]=[I_{1D}, I_{2D}, I_{3D}]$ now show the same opening instants $t_{O1}$, $t_{O2}$, $t_{O3}$ for each electric phase. Thus, the first simulation values $[I_S]=$ $[I_{1S}, I_{2S}, I_{3S}]$ substantially match the detection values $[I_D]=[I_{1D}, I_{2D}, I_{3D}]$ in the period of time before the opening maneuver OM and during said opening maneuver.

Once the parameters of the lumped parameter model M have been duly calibrated, the method, according to the present disclosure, includes a step of calculating, for each electric phase, basing on the first simulation values $[I_S]=[I_{1S}, I_{2S}, I_{3S}]$ and the second simulation values $[V_S]=[V_{1S}, V_{2S}, V_{3S}]$, a first estimation value $[EN]=[EN_1, EN_2, EN_3]$ indicative of an amount of arc energy released during the opening maneuver OM.

As mentioned above, the first estimation value $[EN]=[EN_1, EN_2, EN_3]$ represents an estimation of the electric energy released during the opening maneuver OM, which has to be somehow dissipated by the breaking components (for example the electric contacts $C_A$, CB) of the switching apparatus during the opening maneuver OM.

The first estimation value $[EN]=[EN_1, EN_2, EN_3]$ thus provides an indirect estimation of the level of wear or damage, to which the breaking components (for example the electric contacts $C_A$, CB) of the switching apparatus have been subject during the opening maneuver OM.

Conveniently, the first estimation value [EN] may be calculated according to the following relation:

$$[EN]=f[P]=f[V_S]*[I_S]$$

where $[P]=[P1, P2, P3]$ is an estimation value of the electric power released during the opening maneuver OM and $[I_S]=[I_{1S}, I_{2S}, I_{3S}]$, $[V_S]=[V_{1S}, V_{2S}, V_{3S}]$ are the above-mentioned first and second simulation values provided in output by the lumped-parameter model M. For the sake of clarity, it is evidenced that the above-mentioned first and second simulation values $[I_S]$, $[V_S]$ are those provided in output by the lumped-parameter model M once the lumped parameters [E], [R], [L] have been duly adjusted through the above-illustrated calibration procedure. In other words, the above-mentioned first and second simulation values $[I_S]$, $[V_S]$ are those provided in output by the lumped-parameter model M once the latter has been duly calibrated in order to describe correctly the behavior of the switching apparatus $CB_1$ during the opening maneuver OM.

The method, according to the present disclosure, includes now a step of calculating, for each electric phase, a second estimation value $[EN_{TOT}]=[EN_{TOT1}, EN_{TOT2}, EN_{TOT3}]$ indicative of an estimated cumulative arc energy released during the operating life of the switching apparatus.

Conveniently, the second estimation value $[EN_{TOT}]$ is calculated, for each electric phase, based on the first estimation values $[EN]=[EN_1, EN_2, EN_3]$ calculated for the opening maneuver OM and for each opening maneuver previously carried out by said switching apparatus (and taken in consideration for the implementation of the method of the present disclosure).

In some embodiments, the second estimation value $[EN_{TOT}]$ is calculated, for each electric phase, as the sum on the first estimation values $[E]=[EN_1, EN_2, EN_3]$ calculated for each opening maneuver carried out by said switching apparatus.

The second estimation value $[EN_{TOT}]=[EN_{TOT1}, EN_{TOT2}, EN_{TOT3}]$ conveniently provides an indirect estimation of the overall level of wear or damage, to which the breaking components (for example the electric contacts $C_A$, $C_B$) of the switching apparatus have been subjected during the whole operating life of the switching apparatus.

The method, according to the present disclosure, conveniently includes the step of comparing, for each electric phase, the second estimation value $[EN_{TOT}]=[EN_{TOT1}, EN_{TOT2}, EN_{TOT3}]$, so calculated, with a predefined threshold value $[EN_{TH}]=[EN_{TH1}, EN_{TH2}, EN_{TH3}]$.

Conveniently, the predefined threshold value $[EN_{TH}]$ is set-up based on suitable laboratory tests, which take into consideration the structural and installation characteristics of the switching apparatus.

The method, according to the present disclosure, conveniently includes the step of determining that anomalous conditions are present in the switching apparatus, if the second estimation value $[EN_{TOT}]$ exceeds the predefined threshold value $[EN_{TH}]$ for at least an electric phase.

In this case, in fact, it means that, very likely, the breaking components (for example the electric contacts $C_A$, $C_B$) of the switching apparatus have been subject to an excessive level of wear or damage. A maintenance intervention is therefore advisable in these conditions.

Instead, if the second estimation value $[EN_{TOT}]$ does not exceed the predefined threshold value $[EN_{TH}]$ for all the electric phases, it means that, very likely, the breaking components (for example the electric contacts $C_A$, $C_B$) of the switching apparatus are still in good operating condition. A maintenance intervention can therefore be postponed for cost saving purposes with a reasonable probability of not incurring in sudden faults and service outages of the switching apparatus.

In some embodiments, the method, according to the present disclosure, includes the step of providing an alarm signal, if it is determined that anomalous conditions present are in said switching apparatus. Conveniently, such an alarm signal may be locally provided in the form of an acoustic or light signal in such a way to be promptly appreciated by an operator on the field.

Also, the above-mentioned alarm signal may be remotely transmitted to a computerized device or platform for remote diagnostic purposes.

As mentioned above, the method of the present disclosure can be cyclically repeated for each opening maneuver of the switching apparatus, independently on the operating conditions of the electric line 100, in which said opening maneuver has been carried out.

However, according to some embodiments of the present disclosure, the above-illustrated steps of the method of the present disclosure may be cyclically repeated only for opening maneuvers of the switching apparatus, which have been carried out in short-circuit conditions or in overload conditions or in both these operating conditions.

The method, according to the present disclosure, is particularly suitable for being implemented by a computerized device.

In a further aspect, the present disclosure thus relates to a computer program including software instructions to carry out the method, according to the present disclosure.

The computer program is stored or storable in a storage medium, e.g., in a memory of the computerized device.

In a further aspect, the present disclosure further relates to a computerized device including computerized resources (e.g. one or more microprocessors) configured to execute software instructions to carry out the method, according to the present disclosure.

According to possible embodiments of the present disclosure, such a computerized device may be a controller (e.g. an electronic protection relay, a trip unit or an IED) installed on board a switching apparatus or operatively associated thereto.

According to other possible embodiments of the present disclosure, the computerized device may be a stand-alone controller installed on the field or positioned at a remote location with respect to the grid sector 200.

The method, according to the present disclosure, is quite effective in estimating the actual operating conditions of the breaking components of the switching apparatus.

Such an estimation is based on a calculation of the electric energy (arc energy) released during the opening maneuvers of the switching apparatus. The calculation of the released electric energy is, in turn, carried out by suitably modelling the behavior of the switching apparatus during each opening maneuver, starting from detection data (the detection values [b]), which are normally available to controllers designed to manage electric power distribution grids.

By automatically executing the method of the present disclosure for an opening maneuver of the switching apparatus, a controller can easily carry out a post-event analysis of the operating conditions of the switching apparatus and provide predictive information about the presence of possible anomalous operating conditions in the switching apparatus.

As it is apparent, this capability is quite useful to plan maintenance interventions in an effective way and to optimize maintenance costs.

Besides, the information during the execution of the method of the present disclosure can be easily exploited for other purposes.

For example, the first and second simulation values [$I_S$], [$V_S$] provided by the lumped-parameter model M can be suitably combined with topology data related to the grid sector, in which the switching apparatus is installed. This allows estimating the actual position of a fault (e.g. a short-circuit fault) along an electric line 100.

As a further example, the first and second simulation values [$I_S$], [$V_S$] provided by the lumped-parameter model M for a given switching apparatus can be processed for checking the behavior of adjacent switching apparatuses. For example, if the above-mentioned simulation values are indicative of a very high current flowing along the switching apparatus during an opening maneuver, a grid controller may issue an alert if an adjacent switching apparatus, which should have intervened as well, has not operated for some reasons.

As yet another example, the first estimation values [EN] provided by the method of the present disclosure can be integrated with simulation data obtained from a gas dynamic model of the switching apparatus in order estimate possible gas pressure peaks or damages at cabinet level.

The method, according to the present disclosure, is particularly adapted to be implemented using the hardware and software resources that are already present in a controller installed on the field. The method, according to the present disclosure, is thus particularly adapted for being implemented in digitally enabled power distribution networks (smart grids, micro-grids and the like).

The method, according to the present disclosure, is of relatively easy and cost-effective practical implementation on the field.

The invention claimed is:

1. A method for estimating operating conditions of a switching apparatus installed in an electric line, wherein said switching apparatus comprises at least one electric phase and, for each electric phase, at least a pair of electric contacts that can be coupled or separated to allow or prevent a current to flow through said switching apparatus, wherein said method includes the following, upon execution of an opening maneuver by said switching apparatus:

acquiring detection values indicative of the current flowing through said switching apparatus during the opening maneuver;

providing a lumped-parameter model describing, for each electric phase, a behavior of said switching apparatus during said opening maneuver, said lumped-parameter model being configured to calculate first simulation values indicative of the current flowing through said switching apparatus during said opening maneuver and second simulation values indicative of a voltage between the electric contacts of said switching apparatus under separation during said opening maneuver;

adjusting, for each electric phase, one or more lumped parameters of said lumped-parameter model in such a way that the first simulation values calculated by said lumped-parameter model match said detection values;

based on the first simulation values and the second simulation values calculated by said lumped-parameter model with adjusted lumped parameters, calculating, for each electric phase, a first estimation value indicative of an amount of arc energy released during said opening maneuver;

calculating, for each electric phase, a second estimation value indicative of an estimated cumulative arc energy released during an operating life of said switching apparatus, said second estimation value being calculated, for each electric phase, based on the first estimation value calculated for said opening maneuver and for one or more preceding opening maneuver by said switching apparatus;

comparing, for each electric phase, said second estimation value with a predefined threshold value;

determining that anomalous conditions are present in said switching apparatus when said second estimation value exceeds said predefined threshold value, for at least one electric phase of said switching apparatus; and providing an alarm signal, when it is determined that the anomalous conditions are present in said switching apparatus.

2. The method according to claim 1, wherein adjusting one or more lumped parameters of said lumped-parameter model further comprises:

acquiring, for each electric phase, test values indicative of the current flowing through said switching apparatus during an opening maneuver, in which said switching apparatus operates in predetermined operating conditions; and initially setting, for each electric phase, one or more parameters of said lumped-parameter model in such a way that the first simulation values provided in output by said lumped-parameter model match said test values.

3. The method according to claim 2, wherein adjusting one or more lumped parameters of said lumped-parameter model further comprises:

adjusting, for each electric phase, one or more parameters of said lumped-parameter model in such a way that the first simulation values provided in output by said lumped-parameter model match said detection values in terms of initial time and phase sequence.

4. The method according to claim 3, wherein adjusting one or more lumped parameters of said lumped-parameter model further comprises:

adjusting, for each electric phase, one or more parameters of said lumped-parameter model in such a way that the first simulation values provided in output by said lumped-parameter model match said detection values in terms of peak current and power factor.

5. The method according to claim 4, wherein adjusting one or more lumped parameters of said lumped-parameter model further comprises:
adjusting, for each electric phase, one or more parameters of said lumped-parameter model in such a way that the first simulation values provided in output by said lumped-parameter model match said detection values in terms of opening instant.

6. The method according to claim 1, wherein said second estimation value is calculated, for each electric phase, as a sum of the first estimation value calculated for each opening maneuver carried out by said switching apparatus.

7. The method according to claim 1, wherein the method is carried out for opening maneuvers carried out by said switching apparatus in short-circuit conditions or overload conditions or both short-circuit and overload conditions.

8. A computer program, which is stored or storable in a non-transitory storage medium, wherein the computer program comprises software instructions to implement a method, according to claim 1.

9. A computerized device, wherein the computerized device comprises data processing resources configured to execute software instructions to implement a method, according to claim 1.

10. The computerized device according to claim 9, wherein the computerized device is a controller for an electric power distribution grid.

11. The computerized device according to claim 9, wherein the data processing resources are further configured to execute software instructions to implement a method, according to claim 3.

12. The computerized device according to claim 9, wherein the data processing resources are further configured to execute software instructions to implement a method, according to claim 4.

13. The computerized device according to claim 9, wherein the data processing resources are further configured to execute software instructions to implement a method, according to claim 5.

14. The computerized device according to claim 9, wherein the data processing resources are further configured to execute software instructions to implement a method, according to claim 6.

15. The computerized device according to claim 9, wherein the data processing resources are further configured to execute software instructions to implement a method, according to claim 7.

16. The computer program according to claim 8, wherein the computer program further comprises software instructions to implement a method, according to claim 3.

17. The computer program according to claim 8, wherein the computer program further comprises software instructions to implement a method, according to claim 4.

18. The computer program according to claim 8, wherein the computer program further comprises software instructions to implement a method, according to claim 5.

19. The computer program according to claim 8, wherein the computer program further comprises software instructions to implement a method, according to claim 6.

* * * * *